United States Patent [19]

Heitz et al.

[11] 4,454,281

[45] Jun. 12, 1984

[54] FORMULATION FOR HIGH CLARITY LINEAR LOW DENSITY POLYETHYLENE FILM PRODUCTS

[75] Inventors: William D. Heitz, Flagtown; George E. Ealer, Whitehouse Station; Gary S. Cieloszyk, Somerville, all of N.J.

[73] Assignee: Union Carbide Corporation, Danbury, Conn.

[21] Appl. No.: 445,944

[22] Filed: Dec. 1, 1982

[51] Int. Cl.$^3$ .................... C08K 5/09; C08L 23/08
[52] U.S. Cl. .................... 524/399; 523/100; 524/394; 524/400; 524/570; 524/579
[58] Field of Search ............ 524/399, 394, 400, 570, 524/579; 523/100

[56] References Cited

U.S. PATENT DOCUMENTS

| | | | |
|---|---|---|---|
| 2,462,331 | 2/1949 | Myers | 524/399 |
| 3,261,900 | 7/1966 | Spillers | 264/140 |
| 3,367,926 | 2/1968 | Voeks | 524/213 |
| 3,657,114 | 4/1972 | Smith | 524/399 |
| 4,010,127 | 3/1977 | Taka et al. | 524/399 |
| 4,011,382 | 3/1977 | Levine et al. | 526/98 |
| 4,243,619 | 1/1981 | Fraser et al. | 264/237 |
| 4,255,303 | 3/1981 | Keogh | 524/399 |
| 4,302,566 | 11/1981 | Karol et al. | 526/348 |
| 4,368,286 | 1/1983 | Hayashi et al. | 524/394 |

*Primary Examiner*—Ronald W. Griffin
*Attorney, Agent, or Firm*—Clement J. Vicari

[57] ABSTRACT

An ethylene polymer film forming composition comprising an ethylene polymer and from about 450 to about 6000 ppm preferably 500 to 5000 ppm of metal salt of a fatty acid having from 7 to 22 carbon atoms and from about 300 to 7000 ppm preferably 500 to 4000 ppm of an antiblocking agent.

6 Claims, No Drawings

FORMULATION FOR HIGH CLARITY LINEAR LOW DENSITY POLYETHYLENE FILM PRODUCTS

FIELD OF THE INVENTION

This invention relates to an ethylene polymer plastic composition and more particularly to an ethylene polymer plastic composition useful for producing film products with improved transparency and high gloss while maintaining commercially acceptable treating, printing, sealing and blocking characteristics.

DESCRIPTION OF THE PRIOR ART

Polyolefin resins such as polyethylene have been used for many years for the production of a variety of packaging materials and film products.

Specific to film applications, two independent factors affect the ultimate optical properties of films made from narrow molecular weight distribution ethylene polymers; namely, the intrinsic effects (crystallization in nature) and formulation effects (additives introduced to allow proper handling and proper primary and secondary blocking behavior, e.g. antiblock and slip agents).

Unformulated films of very high intrinsic clarity have been produced from narrow molecular weight distribution ethylene polymers by controlling the cooling conditions (U.S. Pat. No. 4,243,619), the addition of conventional high pressure low density polyethylene (U.S. Pat. No. 4,243,619) and incorporation of specific nucleating agents (U.S. Pat. No. 4,243,619). Unfortunately, the negative effects on film opticals of the formulating additives (e.g., antiblock) can, under certain conditions, essentially negate the beneficial effects of prior art techniques developed to generate high clarity films. To compound the problem, relatively high levels of antiblock agents (i.e., diatomaceous earth at 5000 to 8000 ppm) are required to develop the proper handling and blocking characteristics of films produced from narrow molecular weight distribution ethylene polymers. Hence, to improve the film opticals or ethylene polymers, the negative formulation effect on film opticals must be reduced.

Prior art techniques have discussed formulation aspects and their influence on the film opticals or polyethylene films. It is known that metal salts of fatty acids can be added to polyethylene to improve the slip properties, to reduce blocking, enhance the processability and improve clarity. The amounts used according to the prior art, e.g. U.S. Pat. Nos. 3,367,926; 2,462,331; and 3,261,900, are in excess of 500 parts per million. However, from a commercial point of view, films containing such quantities of the foregoing metal salts were identified to have poor heat sealing characteristics. In U.S. Pat. No. 3,657,114 ethylene polymers having improved surface gloss and haze with good heat sealability were made by incorporating into the polymer (from 20 to about 400 ppm) a zinc salt of a monocarboxylic aliphatic saturated or unsaturated acid having a chain length of 7 to 22 carbon atoms. As stated in U.S. Pat. No. 3,657,114, it was found that concentrations of zinc fatty acid salts greater than 400 ppm adversely affect the heat sealability range of articles such as films fabricated from the ethylene polymers. It was believed that the beneficial results obtained according to U.S. Pat. No. 3,657,114 were attributed to the discovery of a concentration range of the metal salts of fatty acids which appears to have a surprising effect in that a more uniform degree of crystallinity was obtained. It was further believed that the improvement in gloss was not due to the presence of metal salts on the surface of the film.

SUMMARY OF THE INVENTION

The present invention provides an ethylene polymer film forming composition comprising an ethylene polymer and from about 450 to about 6000 parts per million preferably 500 to 5000 ppm of a metal salt of a fatty acid having from 7 to 22 carbon atoms and from about 300 to 7000 preferably 500 to 4000 ppm of an antiblocking agent.

The preferred metal salt is a zinc salt of a fatty acid having from 7 to 22 carbon atoms and most preferably zinc stearate.

It has been found that a metal salt preferably a zinc salt of a fatty acid having from 7 to 22 carbon atoms improves the film opticals of ethylene polymers by permitting a reduction or elimination of conventional inorganic antiblocking agents, while maintaining commercially required handling and film fabrication characteristics. Conventional inorganic antiblocking agents have a detrimental effect on film properties by contributing to higher haze and lower gloss.

DESCRIPTION OF THE PREFERRED EMBODIMENTS

The present invention relates to an ethylene polymer plastic composition which when extruded, forms a film or article having good clarity, the composition comprising an ethylene polymer resin, and from about 450 to about 6000 ppm of a metal salt of a fatty acid having from 7 to 22 carbon atoms and from about 300 to 7000 ppm of an antiblocking agent.

The preferred metal utilized is zinc and the preferred zinc salt is zinc stearate.

The antiblocking agents which can be utilized include inorganic antiblocking agents having an average particle diameter of 1-10 microns and particle diameter ranging from 0.1 to 15 microns. Such antiblocks include amorphous silica, diatomaceous earth, calcium carbonate, syloids, clays, talcs i.e. additives which contribute to reduced opticals, high haze and lower gloss.

The metal salt and antiblocking agent can be added to the ethylene polymer as individual components or admixtures and mixed by any suitable mixing means.

The antiblocking agent can be uniformly dispersed in the ethylene based extrusion composition. The dispersion can be effected by various dispersion techniques commonly employed by those skilled in the art or preparing extrudable compositions. The antiblock agent can be introduced into the ethylene polymer containing the metal salt, or along with the metal salt either by directly dry blending or by mixing via Henschel type intensive mixer. The antiblocking agent and metal salt can also be hot compounded directly into the ethylene polymer or into a base polymer to make a masterbatch for the final letdown using conventional hot processing equipment such as a Banbury mixer, a Werner Pfleider twin screw mixing extruder or a single screw mixer extruder that has pelletization equipment on the head of the extruder.

Ethylene Polymers

The ethylene polymers which can be included in the present invention include hydrocarbon copolymers of a major mole percent (greater than or equal to 85%) of ethylene, and a minor mole percent (less than or equal to 15%) of one or more $C_3$ to $C_8$ alpha olefins. The $C_3$ to $C_8$ alpha olefins should not contain any branching on any of their carbon atoms which is closer than the fourth carbon atom. The preferred $C_3$ to $C_8$ alpha olefins are propylene, butene-1, pentene-1, 4 methyl-pentene-1, hexene-1 and octene-1.

The ethylene copolymers have a melt flow ratio of greater than or equal to 22 to less than or equal to 40 and preferably of greater than or equal to 25 or less than or equal to 33. The melt flow ratio value is another means of indicating the molecular weight distribution of a polymer. The melt flow ratio (MFR) range of greater than or equal to 25 to less than or equal to 33 thus corresponds to a Mw/Mn value range of about 2.7 to 4.1. The polymers herein include a Mw/Mn value of the range of about 2.2 to 4.5. The melt index ranges from 0.1 to 100 gm/10 min. These are considered to be linear narrow molecular weight distribution ethylene copolymers.

The copolymers have a density of about greater than or equal to 0.910 to less than or equal to 0.960 and preferably greater than or equal to 0.915 to less than or equal to 0.945, and most preferably, of about greater than or equal to 0.917 to less than or equal to 0.935. The density of the copolymer, at a given melt index level for the copolymer, is primarily regulated by the amount of $C_3$ to $C_8$ comonomer which is copolymerized with the ethylene. In the absence of the comonomers, the ethylene would homopolymerize with a catalyst to provide homopolymers having a density of about greater than or equal to 0.96. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions.

The ethylene polymers of the present invention have a total unsaturated group content of less than or equal to 1, and usually greater than or equal to 0.1 to less than or equal to 0.35, $C=C/1000$ carbon atoms. The ethylene polymers used in the present invention are useful for making films.

Also included in the term polymers are blends of one polymer with one or more other polymers. Illustrative of such blends are ethylene/olefinic polymers with one or more of the following: polypropylene, high pressure low-density polyethylene, high density polyethylene, polybutene-1, and molar monomer containing olefin copolymers such as ethylene/acrylic acid copolymers, ethlene/methyl acrylate copolymer, ethylene/ethylacrylate copolymer, ethylene/vinyl acetate copolymer, ethylene/acrylic acid/ethyl acrylate terpolymer, ethylene/acrylic acid/vinyl acetate terpolymer, and the like.

Preferred low pressure, low density ethylene copolymers for use in the present invention include those which may be produced in accordance with the procedures set forth in U.S. Pat. No. 4,302,566 issued on Nov. 24, 1981 in the names of F. J. Karol et al. and entitled "Preparation of Ethylene Copolymers in Fluid Bed Reactor", and the procedures set forth in U.S. Pat. No. 4,302,565 issued on Nov. 24, 1981 in the names of G. L. Goeke et al. and entitled "Impregnated Polymerization Catalyst, Process for Preparing, and Use for Ethylene Copolymerization" as well as procedures which will produce ethylene hydrocarbon copolymers with properties as heretofore described.

Other low pressure, low density ethylene polymers preferred for use in the present invention are those which may be prepared as described in U.S. Pat. No. 4,011,382, entitled "Preparation of Low and Medium Density Ethylene Polymer in Fluid Bed Reactor" by I. J. Levine et al., the disclosure of which is incorporated herein by reference.

The ethylene polymers can be used in the form of powders, pellets, granules, or any other form that can be fed to an extruder.

Extrudable Compositions

The extrudable compositions of the invention may be used in any of the forms of such compositions which are commonly employed in the extruded film arts, such as compounds modified with various slip agents for specific end use applications.

These extrudable compositions are thermoplastic in nature. In addition to the ethylene polymer, metal salts of a fatty acid having from 7 to 22 carbon atoms and antiblocks are used. The compositions of the present invention can contain other adjuvant materials which are commonly employed in ethylene polymer-based extrudable compositions. Such other adjuvants would include plasticizers, pigments, lubricants, slip agents, antioxidants, stabilizers, nucleating agents, modifiers and similar materials.

The plasticizers which may be employed in the ethylene polymer-based extrudable compositions of the present invention are the plasticizers which are commonly used with such polymers. The plasticizers are used in amounts which would correspond to about 1 to 25 percent weight based on the weight of ethylene polymers. Such plasticizers would include material such as phtalates, phosphates, adipates, azelates, amine based polyols, and a number of other similar products.

The lubricants which are commonly employed in the ethylene polymer-based extrudable compositions are the lubricants which are commonly used with such polymers. The lubricants are used in amounts which corresponds to about 0.01 to 0.2 percent by weight of lubricant agent based on the weight of the ethylene polymer. Examples of such lubricants are fatty acid amides such as oleamide and erucamide.

Extruding Conditions

Film

The films produced by the compositions of the present invention can be extruded by tubular blown film extrusion such as disclosed in U.S. Pat. No. 4,243,619 issued Jan. 6, 1981. In the patent process a molten, narrow molecular weight distribution ethylene hydrocarbon copolymer is extruded through an annular die having a die gap of greater than about 50 mils to less than about 120 mils, preferably greater than about 50 mils to less than about 100 mils. The copolymer is extruded at a temperature of about 325° F. to about 500° F., and is extruded in an upward vertical direction in the form of a tube although it can be extruded downward or even sideways. After extrusion of the molten polymer through the annular die, the tubular film is expanded to the desired extent, cooled, or allowed to cool and flattened. The tubular film is flattened by passing the film through a collapsing frame and a set of nip rolls. These nips rolls are driven, thereby providing means for withdrawing the tubular film away from the annular die.

A positive pressure of gas, for example, air or nitrogen, is maintained inside the tubular bubble. As is known in the operation of conventional film processes, the pressure of the gas is controlled to give the desired degree of expansion of the tubular film. The degree of expansion, as measured by the ratio of the fully expanded tube circumference to the circumference of the die annulus, is in the range of 1/1 to 6/1 and preferably, 1/1 to 4/1.

As the ethylene hydrocarbon copolymer exits the annular die, the extrudate cools and its temperature falls below its melting point and it solidifies. The optical properties of the extrudate change as crystallization occurs and a frost line is formed. The position of this frost line above the annular die is a measure of the cooling rate or the copolymer film. This cooling rate has a very marked effect on the optical properties of the ethylene hydrocarbon copolymer film produced herein.

Crystallization effects, as discussed previously, dominate the optical properties of the ethylene polymer films described herein. Blown film process parameters have a very pronounced effect on the optical properties of these films.

Preferably the blown film is formed by the process disclosed in U.S. application Ser. No. 430,370 entitled "Process for Forming Film from Low Strain Hardening Polymers" and which was filed on Sept. 30, 1982 in the name of David N. Jones.

Briefly, as disclosed therein this is provided a process for forming a blown film from a normally solid thermoplastic resin having an extensional viscosity index of less than about 6 which comprises extruding said resin through the die lips or a tubular film die to form a molten tube, expanding the molten tube radially at an angle of at least 45° as measured from the longitudinal axis of the expanding film bubble, said angle being substantially maintained at at least 45° for a distance of at least one inch along the longitudinal cross section taken through the longitudinal axis of the expanding film bubble and thereafter contacting said film bubble with a primary cooling stream.

In another aspect, there is provided an improvement in the process for forming a blown film from a normally solid thermoplastic resin having an extensional viscosity index of less than about 6 wherein the resin is extruded through the die lips of a tubular film die under conditions and in a manner such as to form a molten tube or the resin, allowing the molten tube to expand to form a film bubble, directing a flow or fluid in a manner such that a reduced pressure zone is created outside the film bubble, and wherein the film bubble is cooled by a primary cooling stream the improvement which comprises expanding the film bubble radially at an angle of at least 45° as measured from the longitudinal axis of the expanding film bubble, said angle being substantially maintained at at least 45° for a distance or at least one inch along a longitudinal cross section taken through the longitudinal axis of the expanding film bubble prior to contact with the primary cooling stream.

According to the disclosure of application Ser. No. 430,370, in a preferred aspect, the film bubble is expanded until said film bubble is at least 1.5 times the diameter of said molten tube leaving said die lips, prior to contact with the primary cooling stream. In a still further preferred aspect, the film bubble is reduced in thickness to at least about 30% of the initial thickness of the film leaving the extrusion die prior to contact with the primary cooling stream. Films can also be prepared by slot cast technology as is well known in the art.

The films produced by the composition of the present invention are usually prepared in tubing or sheeting which are about 0.1 to 10 mils thick.

Properties of Ethylene Polymers, Films and Articles

The properties of the ethylene polymers, film and articles produced therefrom, were determined by the following methods:

Density: ASTM D-1505—Plaque is conditioned for one hour at 100 C. to approach equilibrium crystallinity—reported as gms/cm$^3$.

Melt Index (MI): ASTM-1238—Condition E—measured at 190° C.—reported as grams per 10 minutes.

Flow Index (HLMI): ASTM D-1238—Condition F—measured at 10 times the weight used in the melt index test above—reported as grams per 10 minutes.

Melt Flow Ratio (MFR): Flow Index/Melt Index.

Molecular Weight Distribution Mw/Mn: Gel Permeation Chromatography styragel column packaging, pore size packing sequence is $10^7$, $10^5$, $10^4$, $10^3$, 60A; Solvent: Perchlorethylene at 117 C. Detection: Infrared at 3.45 m.

Haze: ASTM D-1003-61—Percentage of transmitted light scattered more than 2.5' dfrom the normal incident beam. Reported as percent haze.

45° Specular Gloss ASTM D-2457-70. Gloss measurements were made using a Gardner Model UX-6 glossmeter. 45° specular gloss is the relative luminous fractional reflectance of a film specimen where the incident beam is 45% off the normal and, the receptor is at the mirror reflection of the axis of the incident beam.

Induced Blocking:
  a. Separate and rejoin two (2) 6"×6" film specimens.
  b. Place each set of specimens between 6"×6" glass plates and place a five (5)-pound load on the top of a stack of these plates. Test at least five sets of specimens per film sample. The load applied equals approximately 0.14 psi or about 1 kPa.
  c. Place in a 60° C. controlled environment for 24 hours and then remove and cool.
  d. Test specimens on water balance or other normal force tester. Record the gms-force required to separate the film specimens as the blocking value. A 4"×4" area is tested.

Minimum Fusion Temperature: Minimum Fusion Temperature (MFT) of a film is defined as the minimum temperature at which a seal can be made with:
  a. one-second dwell time: one-inch wide seal,
  b. 15 psi pressure on bar sealer,
  c. hand delamination of seal impossible,
  d. stretching of film neglected.

Seal Factor: The seal factor is the ratio of the Tensile Strength of the seal to the ultimate film tensile strength.

Tensile Strength and Seal Strength: ASTM D-882—Film strips 1"×5" are clamped at a 2" gauge length and deformed at a jaw separation rate of 20 in./min. Tensile strength or seal strength is the engineering stress developed at break.

Wetting Tension: Treatment level is measured according to ASTM D-2578-67.

The following examples are illustrative of the present invention and are not included as a limitation of the scope thereof.

EXAMPLE 1

Preparation of Polymer resins

Low density ethylene-butene-1 copolymer resins were prepared according to the procedure disclosed in South African patent publication No. 79-01365, published Sept. 22, 1980, entitled "Process for Making Film from Low Density Ethylene Hydrocarbon Copolymers," by W. A. Fraser et al. The properties of the ethylene-butene-1copolymer resin were determined by methods disclosed previously.

One of the ethylene-butene-1 copolymer resins has the following properties: a melt index of 1.0 grms/10 min., a MFR of 26, a density of 0.918 grms/cm$^3$, and a catalyst residue of Ti 2 ppm, Al 70 ppm, Si 60 ppm, and Cl 20 ppm.

EXAMPLES 2-9

An ethylene-butene-1copolymer prepared as in Example 1, having a melt index of 1.0 grms/10 min and resin density of 0.918 grms/cm$^3$ and containing approximately 200 ppm of "Irganox" (Ciba Geigy) 1076 octadecyl 3-(3',5'-di-tert-butyl-4'-hydroxyphenyl) propionate or (octadecyl 3,5-di-tert-butyl-4-hydroxyhydrocinnamate) as a storage stabilizer, was dry blended with a series of masterbatches containing magnesium stearate or calcium stearate, or aluminum stearate or sodium stearate or zinc stearate or diatomaceous earth (inorganic antiblocking agent). All masterbatches were produced using a 6.0 lb Banbury with a 1.0 MI, 0.918 density ethylene-butene-1 copolymer as the masterbatch base resin. The masterbatches contained 5 wt. % magnesium stearate or 5 wt. % calcium stearate or 5 wt. % aluminum stearate or 5 wt. % sodium stearate or 5 wt. % zinc stearate, while the antiblock masterbatch contained 10% of diatomaceous earth. Dry blends of the 1 MI ethylene-butene-1 copolymer, 10% of a metal stearate masterbatch (generating 5000 ppm metal stearate in the final product) and 6% DYNH (a linear grade high pressure-linear low density polyethylene HP-LLDPE) were subsequently fabricated into tubular films. Dry blends of the 1 MI ethylene-butene-1 copolymer, either 4% or 8% of the antiblock masterbatch (generating 4000 or 8000 ppm antiblock, respectively, in the final product) and 6% DYNH were also processed into films. The tubular film extrusion equipment consisted of a 1½" NMR 24:1 L/D extruder fitted with a standard 24:1 L/D polyethylene mixing screw. The die was a 3" Sano spiral pin configuration with the die gap enlarged to 100 mils. Films were produced at 60 RPM, 22 lbs/hr at 1.35 mil gauge at 2:1 BUR with a frostline height of 6.5 inches.

Table I illustrates, by Examples 2-7, that within a class of metal stearates investigated, zinc stearate improves the blocking performance of said films without contributing to higher haze and reduced gloss. Diatomaceous earth (Examples 8, 9) allows for excellent blocking performance, but adversely contributes to poorer opticals (higher haze and lower gloss) of the ethylene-butene-1 films.

TABLE I
EXAMPLES 2-9

| Example | Additive | Concentration (ppm) | Haze (%) | Gloss (45° Dull) | 60° C. Induced Blocking (grams) |
|---|---|---|---|---|---|
| 2 | None | | 7.0 | 77 | 350 |
| 3 | Magnesium Stearate | 5000 | 7.5 | 66 | 350 |
| 4 | Calcium Stearate | 5000 | 10.2 | 68 | 348 |
| 5 | Aluminum Stearate | 5000 | 6.4 | 68 | 348 |
| 6 | Sodium Stearate | 5000 | 6.1 | 71 | 330 |
| 7 | Zinc Stearate | 5000 | 6.0 | 74 | 165 |
| 8 | Diatomaceous Earth | 4000 | 10.0 | 62 | 44 |
| 9 | Diatomaceous Earth | 8000 | 13.0 | 55 | 20 |

1.35 Mil Film at 2:1 BUR

EXAMPLES 10-20

An ethylene-butene-1 copolymer prepared as in Example 1, having a melt index of 1.0 grms/10 min and a density of 0.918 grms/cm$^3$ and containing approximately 200 ppm of "Irganox" (Ciba Geigy) 1076 octadecyl 3-(3',5'-di-tert-butyl-4'-hydroxyphenyl) propionate or (octadecyl 3,5-di-tert-butyl-4-hydroxyhydrocinnamate) as a storage stabilizer was dry blended with a variety of masterbatches containing zinc stearate and-/or antiblocking agent (diatomaceous earth-inorganic antiblock or synthetic silica-syloids) and/or slip agents to provide the final formulation depicted in Examples 10-20. As in the previous example, the masterbatch base resin was a 1.0 MI ethylene-butene-1 copolymer of 0.918 density. The masterbatches were prepared using a 6.0 lb Banbury. The final film formulation also contained 6% DYNH (a linear grade high pressure-low density polyethylene HP-LDPE resin). The tubular film extrusion equipment and conditions are identical to those described in Examples 2-9.

Examples 10-20, in Table II, exemplify the following: The sealing characteristics as depicted by minimum fusion temperature and seal factor at the minimum fusion temperature are unaffected by the presence of zinc stearate. Mixtures of zinc stearate and inorganic antiblocking agent offer improvement to the film opticals and blocking performance of the ethylene-butene-1 films and offer a convenient technique to tailor film optical/blocking performance.

TABLE II
EXAMPLES 10-20

| Example # | Zinc Stearate (ppm) | Antiblock (Type) | Antiblock Concentration (ppm) | Slip Agent (Type) | Slip Concentration (ppm) | Haze (%) | Gloss (45° Dull) | 60° C. Induced Blocking (grms) | Minimum Fusion Temp. (°F.) | Seal Factor at MFT (%) |
|---|---|---|---|---|---|---|---|---|---|---|
| 10 | None | None | | None | | 6.0 | 68 | 350 | 340 | 40 |
| 11 | 1000 | None | | Oleamide | 800 | 5.9 | 68 | 220 | 340 | 41 |
| 12 | 2000 | None | | Oleamide | 800 | 5.4 | 72 | 156 | 335 | 33 |
| 13 | 4000 | None | | Oleamide | 800 | 5.8 | 71 | 150 | 335 | 30 |
| 14 | None | Diatomaceous Earth | 4000 | None | | 8.7 | 41 | 165 | 340 | 43 |
| 15 | None | Diatomaceous Earth | 4000 | Erucamide | 800 | 7.5 | 65 | 160 | 335 | 31 |

TABLE II-continued

EXAMPLES 10-20

| Example # | Zinc Stearate (ppm) | Antiblock (Type) | Antiblock Concentration (ppm) | Slip Agent (Type) | Slip Concentration (ppm) | Haze (%) | Gloss (45° Dull) | 60° C. Induced Blocking (grms) | Minimum Fusion Temp. (°F.) | Seal Factor at MFT (%) |
|---|---|---|---|---|---|---|---|---|---|---|
| 16 | 2000 | Diatomaceous Earth | 4000 | Erucamide | 800 | 7.1 | 70 | 62 | 340 | 38 |
| 17 | None | Syloid | 1000 | Erucamide | 750 | 6.7 | 67 | 230 | 335 | 42 |
| 18 | 500 | Syloid | 1000 | Erucamide | 750 | 6.8 | 70 | 192 | 335 | 43 |
| 19 | 1000 | Syloid | 1000 | Erucamide | 750 | 6.8 | 67 | 178 | 335 | 42 |
| 20 | 500 | Syloid | 2000 | Erucamide | 750 | 8.5 | 66 | 98 | 335 | 40 |

1.35 Mil at 2:1 BUR

EXAMPLES 21-24

An ethylene-butene-1 copolymer prepared as in Example 1, having a melt index of 1.0 grms/10 min and a density of 0.918 grms/cm$^3$ and containing approximately 200 ppm of "Irganox" (Ciba Geigy) 1076 octadecyl 3-(3',5'-di-tert-butyl-4'-hydroxyphenyl) propionate or (octadecyl 3,5-di-tert-butyl-4-hydroxyhydrocinnamate) as a storage stabilizer was dry blended with a variety of masterbatches containing zinc stearate and/or antiblocking agent (diatomaceous earth-inorganic antiblock or synthetic silica-syloids) and/or slip agents to provide the final formulation depicted in Examples 21-24. As in the previous example, the masterbatch base resin was a 1.0 MI ethylene-butene-1 copolymer or 0.918 density. The masterbatches were prepared using a 6.0 lb Banbury. The final film formulation also contained 6% DYNH (a liner grade HP-LDPE resin). The tubular film extrusion equipment and conditions are identical to those described in Examples 2-9.

As indicated in Table III, the sealing characteristics of said ethylene-butene-1 film containing up to 5000 ppm zinc stearate are essentially identical films containing only antiblock or zinc stearate/antiblock mixtures.

EXAMPLES 25-32

An ethylene-butene-1 copolymer prepared as in Example 1, having a melt index of 1.0 grms/10 min and a density of 0.918 grms/cm$^3$ and containing approximately 200 ppm of "Irganox" (Ciba Geigy) 1076 octadecyl 3-(3',5'-di-tert-butyl-4'-hydroxyphenyl) propionate or (octadecyl 3,5-di-tert-butyl-4-hydroxyhydrocinnamate) as a storage stabilizer, was dry blended with a variety of masterbatches containing zinc stearate and/or antiblocking agent (diatomaceous earth-inorganic antiblock or synthetic silica-syloids) and/or slip agents to provide the final formulation depicted in Examples 25-32. As in the previous examples, the masterbatch base resin was a 1.0 MI ethylene-butene-1 copolymer of 0.918 density. The masterbatches were prepared using a 6.0 lb Banbury. The final film formulation also contained 6% DYNH (a liner grade HP-LDPE resin). The tubular film extrusion equipment and conditions are identical to those described in Examples 2-9.

As indicated in Examples 25-32, Table IV, zinc stearate containing ethylene-butene-1 films have similar treater power requirements to achieve a particular treatment level as fully formulated films containing no zinc stearate.

TABLE IV

EXAMPLES 25-32

| Example # | Zinc Stearate (ppm) | Antiblock (Type) | Antiblock Concentration (ppm) | Slip Agent (Type) | Slip Concentration (ppm) | Treatment Level (dynes/cm$^2$) | Treater Power (watts) |
|---|---|---|---|---|---|---|---|
| 25 | 1000 | None | | Erucamide | 800 | 37 | 72 |
| 26 | 1000 | None | | Erucamide | 800 | 44 | 113 |
| 27 | 3000 | None | | Erucamide | 750 | 37 | 100 |
| 28 | 3000 | None | | Erucamide | 750 | 44 | 191 |
| 29 | 5000 | None | | Erucamide | 750 | 37 | 104 |
| 30 | 5000 | None | | Erucamide | 750 | 44 | 216 |
| 31 | None | Diatomaceous Earth | 4000 | Erucamide | 800 | 37 | 91 |
| 32 | None | Diatomaceous Earth | 4000 | Erucamide | 800 | 44 | 234 |

TABLE III

EXAMPLES 21-24

| Example # | Zinc Stearate (ppm) | Antiblock (Type) | Antiblock Concentration (ppm) | Slip Agent (Type) | Slip Concentration (ppm) | Seal Factor at Minimum Fusion Temp. (°F.) (%) | Seal Factor at 400° F. (%) | Seal Factor at 475° F. (%) |
|---|---|---|---|---|---|---|---|---|
| 21 | None | Diatomaceous Earth | 4000 | Erucamide | 800 | 43 | 41 | 45 |
| 22 | 1000 | None | | Erucamide | 750 | 38 | 43 | 48 |
| 23 | 5000 | None | | Erucamide | 750 | 38 | 45 | 50 |
| 24 | 2000 | Diatomaceous Earth | 4000 | Oleamide | 800 | 38 | 39 | 43 |

What is claimed is:

1. An ethylene polymer film forming composition comprising a linear narrow molecular weight distribution ethylene hydrocarbon copolymer containing greater than or equal to 85% ethylene and less than or equal to 15% of one or more $C_3$ to $C_8$ alpha-olefin, from about 500 to about 5000 parts per million of a zinc salt of a fatty acid having from 7 to 22 carbon atoms and from about 500 to 4000 ppm of an inorganic antiblocking agent.

2. An ethylene polymer film forming composition according to claim 1 wherein said inorganic antiblocking agent is amphorous silica, synthetic silica, talc, diatomaceous earth or calcium carbonate.

3. An ethylene polymer film forming composition according to claim 1 wherein said alpha-olefin is propylene, butene-1, hexene-1,4-methyl pentene-1, or octene-1.

4. An ethylene polymer film forming composition according to claim 1 wherein said zinc salt is zinc stearate.

5. An ethylene polymer film forming composition according to claim 1, wherein said hydrocarbon copolymer has a melt flow ratio of greater than or equal to 25 to less than or equal to 33.

6. An ethylene polymer film forming composition according to claim 1 wherein said hydrocarbon copolymer has a density of about greater than or equal to 0.915 to less than or equal to 0.945.

* * * * *